United States Patent
Wong et al.

(10) Patent No.: US 7,802,117 B2
(45) Date of Patent: Sep. 21, 2010

(54) AUTOMATED POWER MANAGEMENT FOR ELECTRONIC DEVICES

(76) Inventors: Henry Wong, 1270 Oakmead Pkwy., Suite 201, Sunnyvale, CA (US) 94085; Raymond Chow, 1270 Oakmead Pkwy., Suite 201, Sunnyvale, CA (US) 94085

( * ) Notice: Subject to any disclaimer, the term of this patent is extended or adjusted under 35 U.S.C. 154(b) by 925 days.

(21) Appl. No.: 11/633,848

(22) Filed: Dec. 4, 2006

(65) Prior Publication Data
US 2007/0079159 A1  Apr. 5, 2007

Related U.S. Application Data

(63) Continuation-in-part of application No. 10/653,672, filed on Sep. 2, 2003, now abandoned.

(51) Int. Cl.
G06F 1/00 (2006.01)
G06F 1/32 (2006.01)
G06F 13/00 (2006.01)

(52) U.S. Cl. .................. 713/320; 713/300; 710/100
(58) Field of Classification Search .......... 713/300, 713/320; 710/100
See application file for complete search history.

(56) References Cited

U.S. PATENT DOCUMENTS

| | | |
|---|---|---|
| 5,649,210 A | 7/1997 | Allen |
| 5,799,194 A | 8/1998 | Allen et al. |
| 6,000,003 A | 12/1999 | Allen et al. |
| 6,084,961 A * | 7/2000 | Hwang et al. ............ 379/413 |
| 6,104,937 A | 8/2000 | Fujimoto |
| 6,378,026 B1 | 4/2002 | Chan et al. |
| 6,473,359 B1 | 10/2002 | Mitarashi |
| 6,642,760 B1 | 11/2003 | Alon et al. |
| 7,017,056 B1 * | 3/2006 | Lettang et al. ............ 713/310 |
| 7,162,650 B2 * | 1/2007 | Ke et al. ................ 713/300 |
| 2001/0054928 A1 | 12/2001 | Mecier et al. |
| 2007/0079159 A1 * | 4/2007 | Wong et al. ............ 713/300 |

* cited by examiner

*Primary Examiner*—Ji H Bae
(74) *Attorney, Agent, or Firm*—Patent Law Agency, LLC; Peter Ganjian

(57) ABSTRACT

The present invention discloses a power management apparatus and method for devices comprising an interface module that includes receivers for receiving input signals from a device, an auto power management unit coupled with receivers for determining a state of the input signals, and outputting a power management signal based on the determined state of the input signal. Further provided is an electronic unit coupled with the auto power management unit for driving driver units, with the power management signal toggling ON/OFF a status of the electronic unit based on the determined state of the input signal to thereby reduce power utilization.

9 Claims, 5 Drawing Sheets

Second Device

First Device

FIG. 5

| S | W | R | 416 | 418 | 420 |
|---|---|---|-----|-----|-----|
| 0 | 0 | 0 | 1 | 1 | 1 |
| 0 | 0 | 1 | 1 | 1 | 0 |
| 0 | 1 | 0 | 1 | 0 | 1 |
| 0 | 1 | 1 | 1 | 0 | 1 (after W=1, R=0) |
| 0 | 1 | 1 | 1 | 1 | 0 (after W=0, R=1) |
| 1 | 0 | 0 | 0 | 1 | 1 |
| 1 | 0 | 1 | 0 | 1 | 0 |
| 1 | 1 | 0 | 0 | 1 | 1 (after S=1, W=0) |
| 1 | 1 | 0 | 1 | 0 | 1 (after S=0, W=1) |
| 1 | 1 | 1 | 1 | 0 | 1 (after S=0, W=1, R=0) |
| 1 | 1 | 1 | 0 | 1 | 0 (after S=1, W=0, R=1) |
| 1 | 1 | 1 | 1 | 0 | 1 (after S=0, W=1, R=1) |
| 1 | 1 | 1 | 1 | 0 | 1 (after S=1, W=1, R=0) |
| 1 | 1 | 1 | 1 | 0 | 1 (after S=1, W=1, R=1) |
| 1 | 1 | 1 | 0 | 1 | 0 (after S=1, W=1, R=1) |

TRUTH TABLE FOR LATCH 412

AUTOMATED POWER MANAGEMENT FOR ELECTRONIC DEVICES

CROSS-REFERENCE TO RELATED APPLICATIONS

This Application claims the benefit of priority and is a Continuation-In-Part of the prior U.S. Utility Non-Provisional patent application Ser. No. 10/653,672, with a filing date of Sep. 2, 2003 now abandoned, the entire disclosure of which application is expressly incorporated by reference hereby.

BACKGROUND OF THE INVENTION (1) Field of the Invention

The present invention relates to the field of communication interface circuits having connection detection capability for power management and, more particularly, to automated power management for electronic devices such as multi-channel transceivers.

(2) Description of Related Art

Portable electronic devices place high demands for energy consumption on power sources such as batteries. To reduce power consumption of portable electronic devices, circuits have been designed that detect when different features of the devices are not required so to power down those features. The following are a few, exemplary related U.S. Patent Publications that disclose connection detection and power management circuits, including U.S. Pat. Nos. 6,378,026; 5,799,194; 5,649,210; 6,000,003; 6,104,937; 6,642,760; 6,473,359; and U.S. Patent Application Publication 2001/0054928. Regrettably, most prior art circuits are fairly complex in terms of implementation and use, without much added advantage in terms of reduction in power utilization.

In light of the current state of the art and the drawbacks to current connection detection and power management circuits mentioned above, a need exists for a device and a method for connection detection capability for power management for communication circuits and, more particularly, for automated power management for multi-channel transceivers that are simple to implement.

BRIEF SUMMARY OF THE INVENTION

The present invention discloses a power management apparatus for devices, comprising:
an interface module, including:
receivers for receiving input signals from a device;
an auto power management unit coupled with receivers for determining a state of the input signals, and outputting a power management signal based on the determined state of the input signal; and
an electronic unit coupled with the auto power management unit for driving driver units, with the power management signal toggling a status of the electronic unit based on the determined state of the input signal to thereby reduce power utilization.

An optional aspect of the present invention provides a power management apparatus for devices, wherein:
one or more first interface modules are within a first device and coupled with one or more first communication connection devices of the first device;
one or more second interface modules are within a second device and coupled with one or more second communication connection devices of the second device; and
wherein the first device is coupled with the second device through one or more first communication connection devices, and the second device is coupled with the first device through one or more second communication devices.

Another optional aspect of the present invention provides a power management apparatus for devices, wherein:
the receivers are comprised of electrical parameter levelers that convert electrical parameters of the input signals to appropriate magnitude.

Yet another optional aspect of the present invention provides a power management apparatus for devices, wherein:
the auto power management unit includes:
input units that receive input signals from the receivers for producing time delayed output signals;
a sequential logic circuit forming an electronic latch unit having first digital logic operators coupled with the time delayed output signals that generate latching signals;
second digital logic operators coupled with the electronics latch unit that function to invert the latching signals to generate inverted latch signals;
a third digital logic operator coupled with inverted latch signals that combines the inverted latch signals to output a combined signal;
a time delay output unit coupled with the third digital logic operator for delaying the combined signal, and generating the power management signal.

A further optional aspect of the present invention provides a power management apparatus for devices, wherein:
the first digital logic operators are cross-coupled, with a preceding output of a previous of the first digital logic operators coupled with a following input of an adjacent subsequent of the first digital logic operators, and a following output of the adjacent subsequent of the first digital logic operators coupled with a preceding input of the previous of the first digital logic operators, resulting in a set-reset electronic latch unit.

Still a further optional aspect of the present invention provides a power management apparatus for devices, wherein
the first digital logic operators are comprised of NAND function logic gates;
the second digital logic operators are comprised of inverter function logic gates; and
third digital logic operator is comprised of NOR function logic gate.

Another optional aspect of the present invention provides a power management apparatus for devices, wherein:
at least one NAND function logic gate has three inputs.

Yet another optional aspect of the present invention provides a power management apparatus for devices, wherein:
a high signal input in the input unit indicates an activity input status, and a high signal output indicates a power off command for the electronic unit.

A further optional aspect of the present invention provides a power management apparatus for devices, wherein:
a low signal input in the input level indicates a no activity input status, and a low signal output indicates a non-power off command for the electronic unit.

Still a further optional aspect of the present invention provides a power management apparatus for devices, wherein:
the electronic unit is a charge pump.

Another aspect of the present invention provides a method for power management for devices, comprising the acts of:
receiving input signals from a device;
determining a state of the input signals, and outputting a latched power management signal based on the determined state of the input signal to toggle a status of an electronic unit to reduce power utilization.

Yet another aspect of the present invention provides a method for power management for devices, wherein:

the act of outputting the latched power management signal includes:

providing input units that receive input signals from the receivers for producing time delayed input signals;

providing a sequential logic circuit forming an electronic latch unit having first digital logic operators coupled with the delayed input signals that generate latching signals;

providing second digital logic operators coupled with the electronics latch unit that function to invert the latching signals to generate inverted latch signals;

providing a third digital logic operator coupled with inverted latch signals that combines the inverted latch signals to output a combined signal; and providing a time delay output unit coupled with the third digital logic operator for delaying the combined signal, and generating the latched power management signal.

These and other features, aspects, and advantages of the invention will be apparent to those skilled in the art from the following detailed description of preferred non-limiting exemplary embodiments, taken together with the drawings and the claims that follow.

BRIEF DESCRIPTION OF THE DRAWINGS

It is to be understood that the drawings are to be used for the purposes of exemplary illustration only and not as a definition of the limits of the invention. Throughout the disclosure, the word "exemplary" is used exclusively to mean "serving as an example, instance, or illustration." Any embodiment described as "exemplary" is not necessarily to be construed as preferred or advantageous over other embodiments.

Referring to the drawings in which like reference character (s) present corresponding parts throughout:

FIG. 5 is an exemplary illustration of a truth table for a three-channel implementation of the auto power management unit illustrated in FIG. 4.

DETAILED DESCRIPTION OF THE INVENTION

Figure 1:
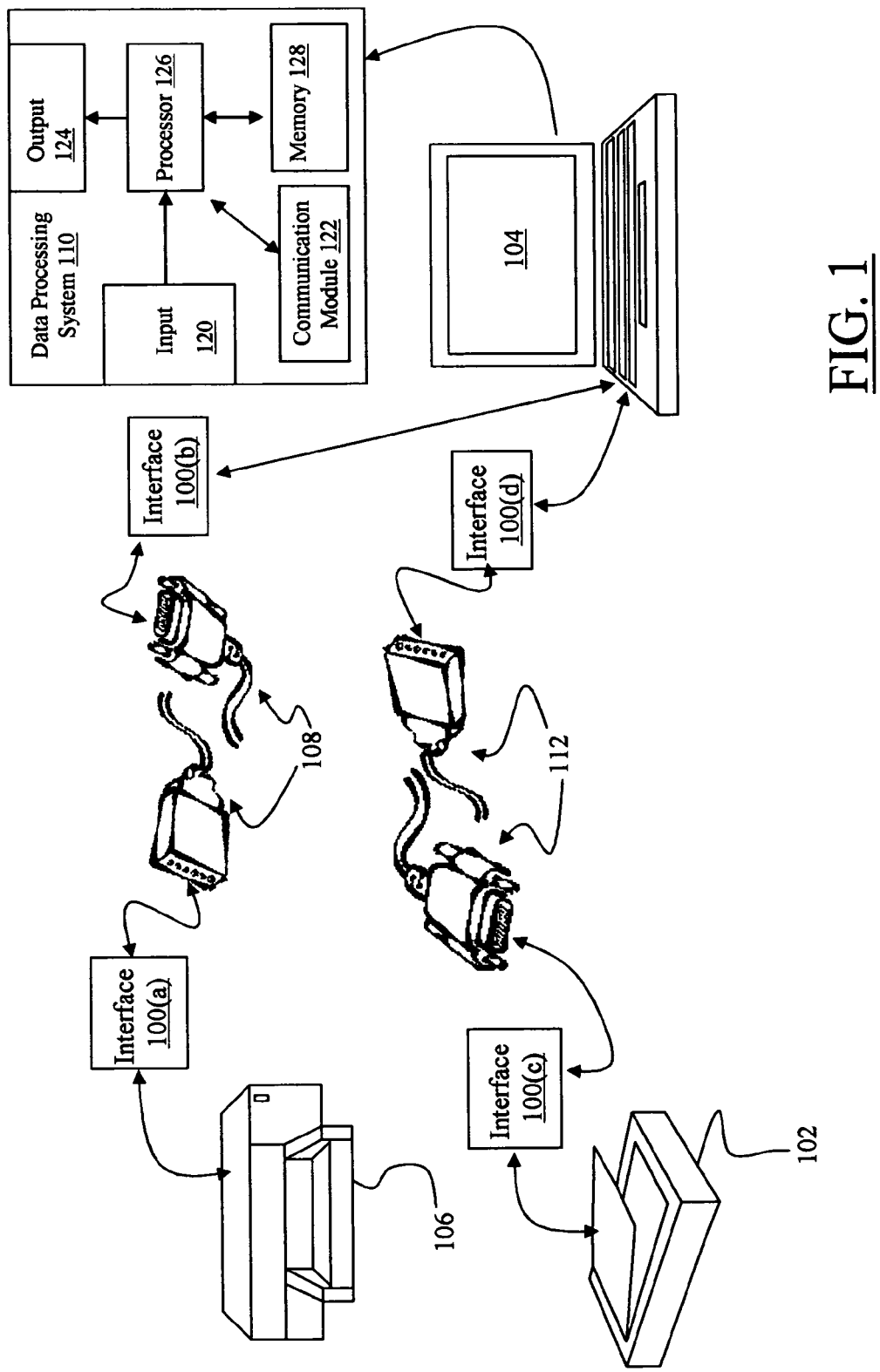
FIG. 1 is an exemplary system view illustration of the power management apparatus of the present invention in the form of an interface module, including various connections within and in between devices within which the interface modules are used in accordance with the present invention.

The detailed description set forth below in connection with the appended drawings is intended as a description of presently preferred embodiments of the invention and is not intended to represent the only forms in which the present invention may be constructed and or utilized.

For purposes of illustration, programs and other executable program components are illustrated herein as discrete blocks, although it is recognized that such programs and components may reside at various times in different storage components, and are executed by the data processor(s) of the computers.

For the sake of convenience and clarity, this disclosure refers throughout to the term device (main device, periphery, periphery device or source/destination systems), the non-limiting examples of which may include a piece of hardware (e.g., printer, modem, etc.) that may reside internal or external of the host system (or destination system). Non-limiting examples of host systems (which themselves may be a device to other host or destination systems) may include a Personal Computer (PC), handheld devices such as Personal Digital Assistance (PDA), communication units such as cellular telephone, etc. Other non-limiting examples of related applications that will benefit from this invention are DSL modems, Network Attached Storage, Storage Area Network, camcorders, toys, games, and any type of peripheral that connects to a host (e.g., a computer) by a communication connection device.

For purposes of illustrations, the various circuit topographies illustrated throughout the disclosure use logic gates, which are symbolic representations of logic functions. The disclosure should not be limited by any specific symbol, logic gate, or any other representation of a logic function, but by the actual logic function itself. Non-limiting examples of logic gates representing logic functions may include OR, AND, XOR, NAND, XNOR, NOR, INV (inverter), or a combination thereof, etc.

The present invention provides an apparatus and a method for power management for devices for reducing power utilization. The present invention provides a detection circuit with a Reset-Set Latch (R/S Latch), in which it detects the connectivity and the state of signals between transceivers of two systems or circuits, and sets or resets the power savings by shutting down or powering off one or both systems that are not in use. Further, the present invention resets the operation of communications between two systems or circuits when the systems or the circuits are ready to transmit or receive again. Methods and apparatus are presented that sense the characteristic of the communication lines to control, indicate, or provide signal to manipulate the amount of power being delivered to the communication lines and or other substantial power consuming circuitry so as to reduce, conserve, and save power to such circuits when they are not in use. Embodiments for detecting or sensing the connectivity, and setting or resetting to execute the power down or power up functions are disclosed.

In particular, the power management apparatus of the present invention detects and receives input signals from a device, and determines a state of the input signals, and outputs a latched power management signal based on the determined state of the input signal to toggle a status of an electronic unit within the devices to reduce power utilization. More specifically, the latched power management signal is provided by input units that receive input signals from the receivers for producing time delayed input signals. The time delayed input signals are input to a sequential logic circuit, which is an electronic latch unit having first digital logic operators coupled with the delayed input signals that generate latching signals. Second digital logic operators are provided that are coupled with the electronics latch unit that function to invert the latching signals to generate inverted latch signals. The inverted latch signals are combined by a third digital logic operator that is coupled with inverted latch signals to output a combined signal. After a predetermined time delay, the combined signal is output as the generated latched power management signal to toggle ON/OFF an electronic unit within the device to save power utilization.

FIG. 1 is an exemplary system view illustration of the power management apparatus of the present invention in the form of an interface module, including various connections within and in between devices within which the interface modules are used in accordance with the present invention. As illustrated in FIG. 1, the interface modules are placed within various devices 106, 102, and 104, and are coupled between various electronics and communications circuitry of those devices and the communication connection devices 108 and 112. In particular, the interface module 100(a) within the periphery device 106 is coupled with various electronic and communication circuitry (not shown) of the periphery device 106, and communication connection device 108. The communication connection device 108 is further coupled with another interface module 100(b) located inside a main device 104, and coupled to various communication and electronic circuitry, generally illustrated as the Data Processing System 110. Non-limiting examples of a typical communication connection device may include RS-232, RS-485, and RS-422 cables. As further illustrated, the interface module 100(c) within the periphery device 102 is coupled with various electronic and communication circuitry (not shown) of the periphery device 102, and a communication connection device 112. The communication connection device 112 is further coupled with another interface module 100(d) located inside the main device 104, and coupled to various communication and electronic circuitry, generally illustrated as the Data Processing System 110. In general, any of the exemplary interface modules 100 detect and receive input signals from any of the devices, and determine a state of the input signals, and output a latched power management signal based on the determined state of the input signals to toggle ON/OFF a status of an electronic unit within a device to reduce power utilization.

The block diagram 110 of FIG. 1 depicts typical, non-limiting, exemplary components of a conventional computer system 104 used in the present invention. The data processing system 110 may be construed as a general computing or communication unit used in a computer or communication network that is comprised of an input 120 for receiving control or data packets from other devices or any inputting mechanism. Non-limiting examples of which may include a communication module 122, an external computer connected to the system, an Internet connection, or any computer readable medium such as a floppy disk, Compact Disk (CD), a Digital Versatile Disk/Digital Video Disk (DVD), and a removable hard drive. The input 120 may also be configured for receiving user input from another input device such as printer 106, scanner 102, a keyboard, a mouse, or any other input device best suited for the current environment conditions. Note that the input 120 may include multiple "ports" for receiving data and user input, and may also be configured to receive information from remote databases using wired or wireless connections. The output 124 is connected with the processor 126 for providing output to the user, possibly through a video display. Output 124 may also be provided to other devices or other programs, e.g. to other software modules, for use therein, possibly serving as a wired or wireless gateway to external databases or other processing devices or nodes. The input 120 and the output 124 are both coupled with a processor 126, which may be a general-purpose computer processor or a specialized processor such as an Application Specific Integrated Circuit (ASIC). The processor 126 is coupled with a memory 128 to permit storage of data and software such as a control packet to be manipulated by commands to the processor.

Figure 2:
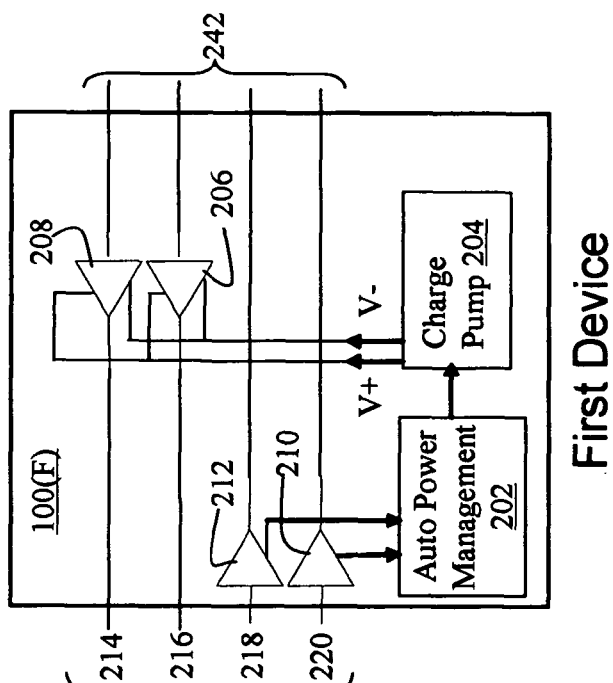
FIG. 2 is an exemplary schematic illustration for an interface module used within devices for reduction of overall power usage in accordance with the present invention.
Figure 2:
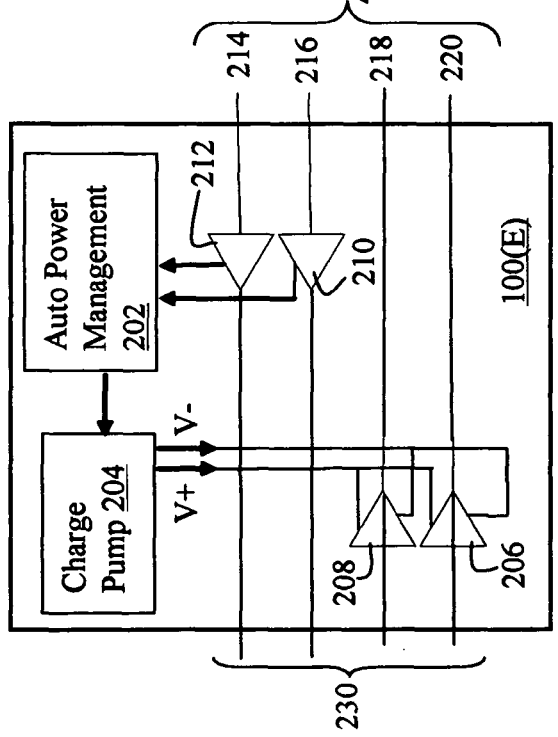

FIG. 2 is an exemplary schematic illustration for an interface module used within devices for reduction of overall power usage in accordance with the present invention. As illustrated in FIG. 2, the power management apparatus of the present invention is comprised of one or more interface modules 100(E) and 100(F) that include receivers 210 and 212 for receiving input signals from a respective connected device. As illustrated, the interface modules are identical, but connected in reverse. That is, the receivers 210 and 212 of a first device interface module (e.g., 100(F)) are coupled with respective input signal lines 218 and 220 that are output from a second device. The receivers 210 and 212 of a second device interface module (e.g., 100(E)) are coupled with the respective input signal lines 214 and 216 that are output from the first device. The number of receivers within each interface module depends on the number of communications channels required for each device, which could vary from one to as many as required. Therefore, the number of the respective signal lines (both input and output) 214, 216, 218, and 220 may vary, and are coupled with the communication connection devices (e.g., RS-232 cable 108). The signal lines cumulatively labeled as 230 for the interface module 100(E) of the second device, and the signal lines cumulatively labeled as 242 for the interface module 100(F) of the first device may also vary in number depending on many factors, including the number of communications channels required for each device. Both groups of signal lines 230 and 242 are coupled with various electronic and communications modules of their respective devices within which the interface modules reside. For example, a few of the signal lines 242 of the interface module 100(F) may be coupled to a processor 126 of the first device 104, which pass command or communications signals through drivers 206 and 208 of the interface module 100(F), with signals from drivers 206 and 208 being output to signal lines 214 and 216. In this instance, the signal lines 214 and 216 of the interface module 100(F) are coupled to the signal lines 214 and 216 of the interface module 100(E) through the communication connection device 108, and function as input signal lines that receive the commands signals from the interface module 100(F). The respective receivers 210 and 212 then receive these input signals.

The reverse signal path processing is also possible. For example, a few of the signal lines 230 of the interface module 100(E) may be coupled to an ASIC processor (not shown) of the second device 102 or 106, which pass command or communications signals through drivers 206 and 208 of the interface module 100(E), with signals from drivers 206 and 208 being output to signal lines 218 and 220. In this instance, the signal lines 218 and 220 of the interface module 100(E) are coupled to the signal lines 218 and 220 of the interface module 100(F) through the communication connection device 108, and function as input signal lines that receive the commands signals from the interface module 100(E). The respective receivers 210 and 212 of the interface module 100(F) then receive these input signals.

As further illustrated in FIG. 2, the interface modules include an auto power management unit 202 coupled with the receivers 210 and 212 for determining a state of the input signals, and outputting a power management signal based on the determined state of the input signals. Further included with the interface modules is an electronic unit such as a charge pump 204 coupled with the auto power management unit 202 for driving the driver units 206 and 208, with the power management signal toggling ON/OFF a status of the electronic unit 204 based on the determined state of the input signals to thereby reduce power utilization. In other words, high input signals would indicate an active state of a connected device, generating a low power management signal to maintain the charge pump in the active (or ON) state. Low input signals would indicate an inactive state for a device, generating a high power management signal to toggled the status of the charge pump from active to inactive (or OFF) state, cutting off power to the drivers 206 and 208. Deactivating the charge pump 204 translates in to substantially savings in usage of power with most portable electronic devices. In general, the charge pump 204 is a well-known electrical circuit that generates a voltage larger than the supply voltage from which it operates. It should be noted that the receivers are comprised of well-known electrical parameter levelers that convert electrical parameters of the input signals to appropriate magnitude, such as voltage levelers where voltages are converted from one level (e.g., 10V) to another (3 to 5V) or vice versa.

Figure 3:
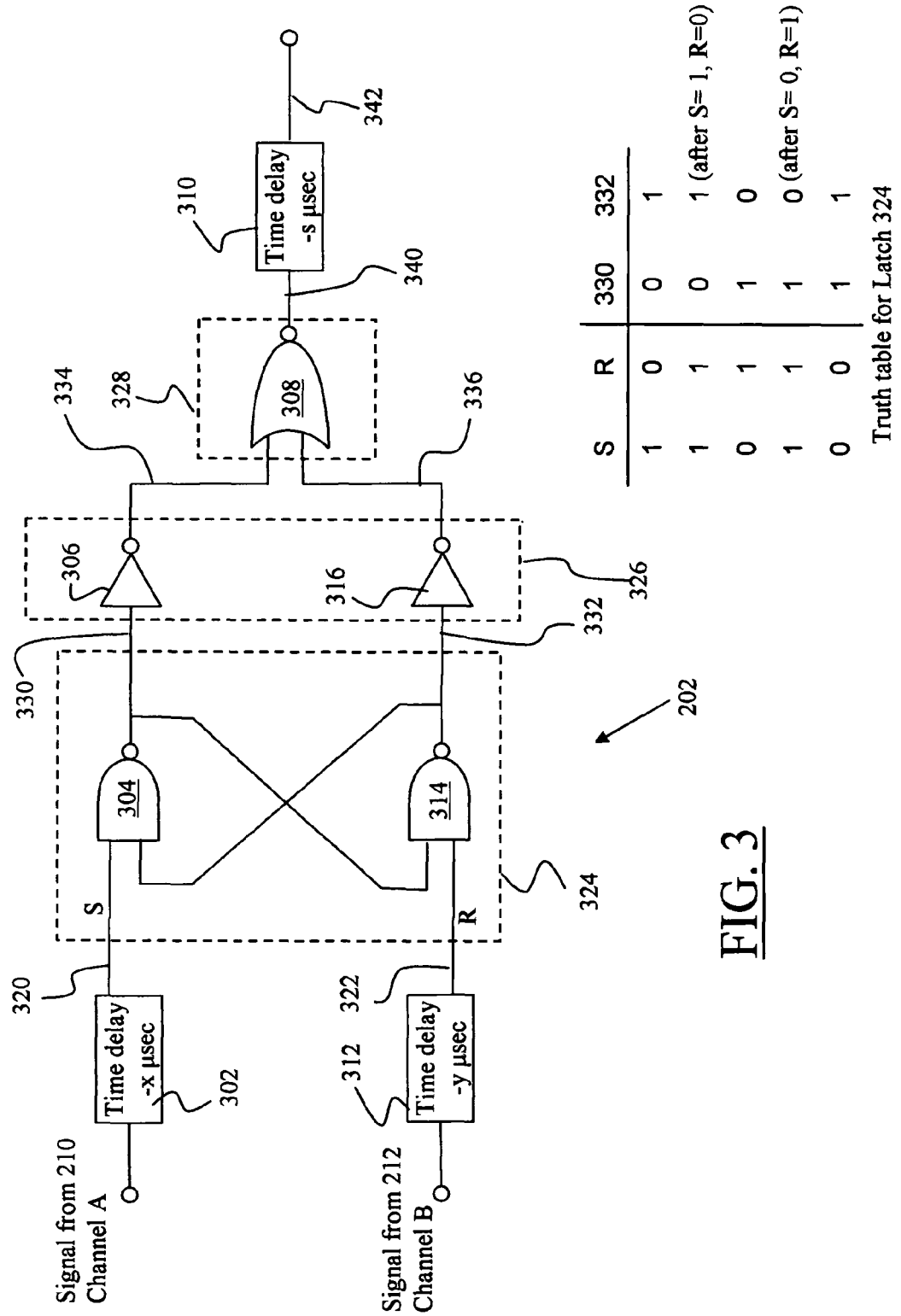
FIG. 3 is an exemplary schematic illustration of an auto power management unit in accordance with the present invention.

FIG. 3 is an exemplary schematic illustration of an auto power management unit in accordance with the present invention. As illustrated in FIG. 3, the auto power management unit 202 is comprised of input units 302 and 312 that receive input signals from the receivers 210 and 212 from each respective channel for producing time delayed output signals 320 and 322. The input units 302 and 312 delay the further processing of the input signals by the auto power management unit 202 by a predetermined amount, thereby avoiding the processing of any faulty or erroneous lows or highs within the signals received. The predetermined times for the time delays introduced by the input units for each channel may vary, and each channel may have the same or different time delays, depending on the system requirements.

In particular, the state of receiver input signal 210 passes through the first time delay unit 302 with delayed output signal 320 after approximately x-μsec. The first time delay unit 302 outputs a logic high signal 320 in response to the input signal of logic high approximately x-μsec later, and a logic low signal 320 in response to the input signal 210 of logic low approximately x-μsec later. For the second input unit 312, the state of receiver input signal 212 passes through a second time delay unit 312 with a delayed output signal 322 after approximately y-μsec. The time delay unit 312 outputs a logic high signal 322 in response to the input signal 212 of logic high approximately y-μsec later, and a logic low signal 322 in response to the input signal 212 of logic low approximately y-μsec later. As stated above, these time delays provide a glitch-free input signals to be used by the remaining circuitry.

The time delayed output signals 320 and 322 are coupled with a sequential logic circuit 324 that is an electronic latch unit having first digital logic operators 304 and 314 coupled with the time delayed output signals 320 and 322, generating latching signals 330 and 332. In particular, the time delayed output signals 320 and 322 are coupled with respective inputs of a Set-Rest Latch unit (RS Latch) 324, which is comprised of first digital logic operators in the form a NAND function logic gate 304 and NAND function logic gate 314. The latch operation within the auto power management unit 202 enables maintenance of the latch signals 330 and 332 until the external inputs 320 and 322 together with the current state of the latch signals 330 and 332 are varied. This allows the final output signal, which is the power management signal 342, to be maintained until it is reset by the latch. Accordingly, once the latch signals 330 and 332 are set, they will remain set until a next time sequence inputs, outputs, and internal states of the latch are varied.

The first time delayed output signal 320 of the first time delayed input 302 is coupled with a first input of the RS Latch unit 324, which is the first input terminal of the NAND function logic gate 304. The second time delayed output signal 322 of the second time delay input 312 is coupled with a second input of the RS Latch unit 324, which is the first input terminal of the NAND function logic gate 314. Latching signals 330 and 332 output from the RS Latch unit 324 are cross-coupled with the second input terminals of the NAND function logic gates 314 and 304, respectively, providing an RS Latching function. The operation of the latch unit 324 is well known, and a truth table for the operation and analysis of the latch unit 324 is provided in FIG. 3, with no further details.

The latching signals 330 and 332 of the RS Latch unit 324 are coupled with an inverter unit 326, which is comprised of second digital logic operators 306 and 316 that function to invert the latching signals 330 and 332 to generate inverted latch signals 334 and 336. A third digital logic operator 328 in the form of a NOR function logic gate 308 is coupled with the inverted latch signals 334 and 336 that combines the inverted latch signals 334 and 336 to output a combined signal 340, which is time-delayed by an output unit 310 (by s-μsec) to generate the power management signal 342. The output unit 310 introduces the time delay of s-μsec prior to providing the power management signal 342 to avoid any glitches within the signal, providing a clean error free signal 342. The power management signal 342 servers as the determining signal to shutdown or power-off any power consuming circuits or blocks when deemed necessary, including the charge pump 204. Accordingly, when the state of the input signals 210 and 212 indicate no activity at the communication links, either by disconnection of the communication cable or by powering down the transmitter side of the communication cable, the auto power management unit 202 generates a high power management signal 342. A high power management signal indicates that no activity is detected at the communication links, shutting off the power to the charge pump 204. If any one of the input signals 210 and or 212 are active, the auto power management unit 202 will generate a low logic power management signal 342, allowing the charge pump to remain active.

Figure 4:
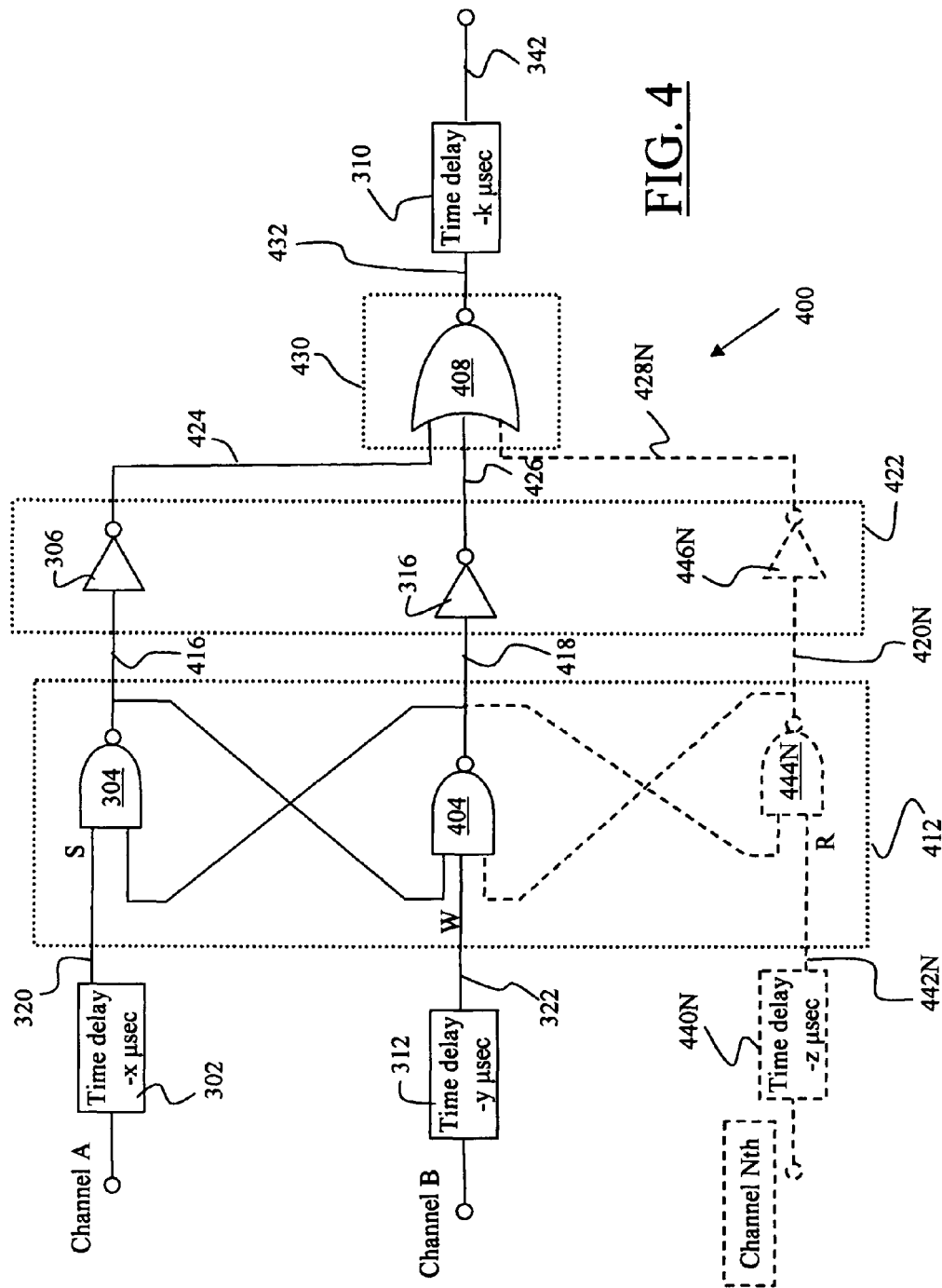
FIG. 4 is an exemplary schematic illustration of generalized N-channel auto power management unit in accordance with the present invention.

FIG. 4 is an exemplary illustration of a power management unit 400 with an increased number of channels for inputs in accordance with the present invention. The power management unit 400 includes similar corresponding or equivalent components as the power management unit 202 that is shown in FIG. 3, and described above. Therefore, for the sake of brevity, clarity, convenience, and to avoid duplication, the general description of FIG. 4 will not repeat every corresponding or equivalent component that has already been described above in relation to power management unit 202 that is shown in FIG. 3.

As illustrated in FIG. 4, the number of channels of communications may vary and hence, the number of input units can be increased to accommodate a corresponding number of channels used. Therefore, for N channels, the present invention provides N input units coupled to N first digital logic operators that are coupled to N second digital logic operators. As was indicated above, the predetermined times for the time delays introduced by the N input units for each channel may vary, and each channel may have the same or different time delays, depending on the system requirements. Accordingly, the illustrated times delays x, y, and z for the respective channels A, B, and the $N^{th}$ channel may be identical or different. The circuit topography for the additional elements required to accommodate N channels of communications lines is illustrated in dashed lines to show an overview, generalization scheme.

As illustrated, an increase in the number of input units to accommodate an increased number of channels is accomplished by adding an input unit 440N, which provides a time delayed input signal 442N as one of the input terminals R to a newly added NAND function logic gate 444N of a modified latch unit 412. The NAND function logic gate 444N is merely added and cross-coupled with the NAND function logic gate 404, which replaces a two terminal NAND function logic gate 314 illustrated in FIG. 3. Hence, as the number of communication channels are increased, the number of NAND function logic gates coupled with the newly added input units are correspondingly increased, and cross-coupled with an existing, adjacent NAND function logic gate. This provides a circuit topography for the latch unit 412 such that the end unit NAND function logic gates of the latch unit 412 are comprised of two or more terminal NAND function logic gates, and the middle units NAND function logic gates are comprised of three or more terminal NAND function logic gates to accommodate cross-coupling with two adjacent NAND function logic gates. To generalize the description of the latch unit, the first digital logic operators are cross-coupled, with a preceding output of a previous of the first digital logic operators coupled with a following input of an adjacent subsequent of the first digital logic operators, and a following output of the adjacent subsequent of the first digital logic operators coupled with a preceding input of the previous of the first digital logic operators, resulting in a N-channel set-reset electronic latch unit. The operation of the latch unit 412 is well known, and a truth table for the operation and analysis of the latch unit 412 is provided in FIG. 5, with no further details.

As further illustrated in FIG. 4, the N-channel inputs provide N latching signals 416, 418, and 420N output from the RS Latch unit 412, which are coupled with an inverter unit 422, which is comprised of second digital logic operators 306, 316, and 446N that function to invert the latching signals 416, 418, and 420N to generate inverted latch signals 424, 426, and 428N. A third digital logic operator 430 in the form of a NOR function logic gate 408 is coupled with the inverted latch signals 424, 426, and 428N that combines the inverted latch signals 424, 426, and 428N to output a combined signal 432, which is time-delayed by an output unit 310 (by k-μsec) to generate the power management signal 342. The output unit 310 introduces the time delay of s-μsec prior to providing the power management signal 342 to avoid any glitches within the signal, providing a clean error free signal 342. The power management signal 342 servers as the determining signal to shutdown or power-off any power consuming circuits or blocks when deemed necessary, including the charge pump 204. Accordingly, when the state of the input signals 210 and 212 indicate no activity at the communication links, either by disconnection of the communication cable or by powering down the transmitter side of the communication cable, the auto power management unit 202 generates a high power management signal 342. A high power management signal indicates that no activity is detected at the communication links, shutting off the power to the charge pump 204.

Although the invention has been described in considerable detail in language specific to structural features and or method acts, it is to be understood that the invention defined in the appended claims is not necessarily limited to the specific features or acts described. Rather, the specific features and acts are disclosed as preferred forms of implementing the claimed invention. Therefore, while exemplary illustrative embodiments of the invention have been described, numerous variations and alternative embodiments will occur to those skilled in the art. For example, the number of input receivers may be greater than the number of channels actually used. The number of receivers need not be a one-to-one correspondence with the number of drivers. Such variations and alternate embodiments are contemplated, and can be made without departing from the spirit and scope of the invention.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, proximal, distal, etc. have been used for convenience purposes only and are not intended to imply any particular fixed direction or orientation. Instead, they are used to reflect relative locations and/or directions/orientations between various portions of an object.

In addition, reference to "first," "second," "third," and etc. members throughout the disclosure (and in particular, claims) is not used to show a serial or numerical limitation but instead is used to distinguish or identify the various members of the group.

What is claimed is:

1. A power management apparatus for devices, comprising:
   an interface module, including:
   receivers for receiving input signals from devices;
   an auto power management unit coupled with the receivers for determining a state of the input signals, and outputting a power management signal based on the determined state of the input signals; and
   an electronic unit coupled with the auto power management unit for driving driver units, with the power management signal toggling a status of the electronic unit based on the determined state of the input signals to thereby reduce power utilization;
   the auto power management unit is comprised of:
   a number of input units that correspond to a number of receivers;
   the input units respectively receive a corresponding number of input signals from the receivers and respectively generate a corresponding number of time delayed output signals;
   the generated time delayed output signals provide glitch-free input signals to a sequential logic circuit;
   the sequential logic circuit forming an electronic latch unit having a corresponding number of first digital logic operators that receive the time delayed output signals and generate a corresponding number of latched signals to maintain respective signal values in their status quo until a new input signal is received from a device;
   a corresponding number of second digital logic operators are coupled with the electronic latch unit that function to invert the generated latched signals and respectively output a corresponding number of inverted latched signals;
   a third digital logic operator receives the inverted latched signals and combines the inverted latched signals to output a combined signal;
   the combined signal is further delayed by a time delay output unit for a predetermined time and output as a glitch-free power management signal.

2. The power management apparatus for devices as set forth in claim 1, wherein:
   one or more first interface modules are within a first device and coupled with one or more first communication connection devices of the first device;
   one or more second interface modules are within a second device and coupled with one or more second communication connection devices of the second device; and
   wherein the first device is coupled with the second device through one or more first communication connection devices, and the second device is coupled with the first device through one or more second communication devices.

3. The power management apparatus for devices as set forth in claim 1, wherein:

the receivers are comprised of electrical parameter levelers that convert electrical parameters of the input signals to appropriate magnitude.

4. The power management apparatus for devices as set forth in claim 1, wherein:

the first digital logic operators are cross-coupled, with a preceding output of a previous of the first digital logic operators coupled with a following input of an adjacent subsequent of the first digital logic operators, and a following output of the adjacent subsequent of the first digital logic operators coupled with a preceding input of the previous of the first digital logic operators, resulting in a set-reset electronic latch unit.

5. The power management apparatus for devices as set forth in claim 1, wherein:

the first digital logic operators are comprised of NAND function logic gates;

the second digital logic operators are comprised of inverter function logic gates; and the third digital logic operator is comprised of a NOR function logic gate.

6. The power management apparatus for devices as set forth in claim 5, wherein:

at least one NAND function logic gate has three inputs.

7. The power management apparatus for devices as set forth in claim 1, wherein:

a high signal input in the input units indicates an activity input status, and a high signal output indicates a power off command for the electronic unit.

8. The power management apparatus for devices as set forth in claim 1, wherein: a low signal input in an input level indicates a no activity input status, and a low signal output indicates a non-power off command for the electronic unit.

9. The power management apparatus for devices as set forth in claim 1, wherein:

the electronic unit is a charge pump.

* * * * *